Dec. 8, 1931.  W. A. SIMMONS  1,835,187
GLARE SHADE
Filed Dec. 27, 1927  2 Sheets-Sheet 1
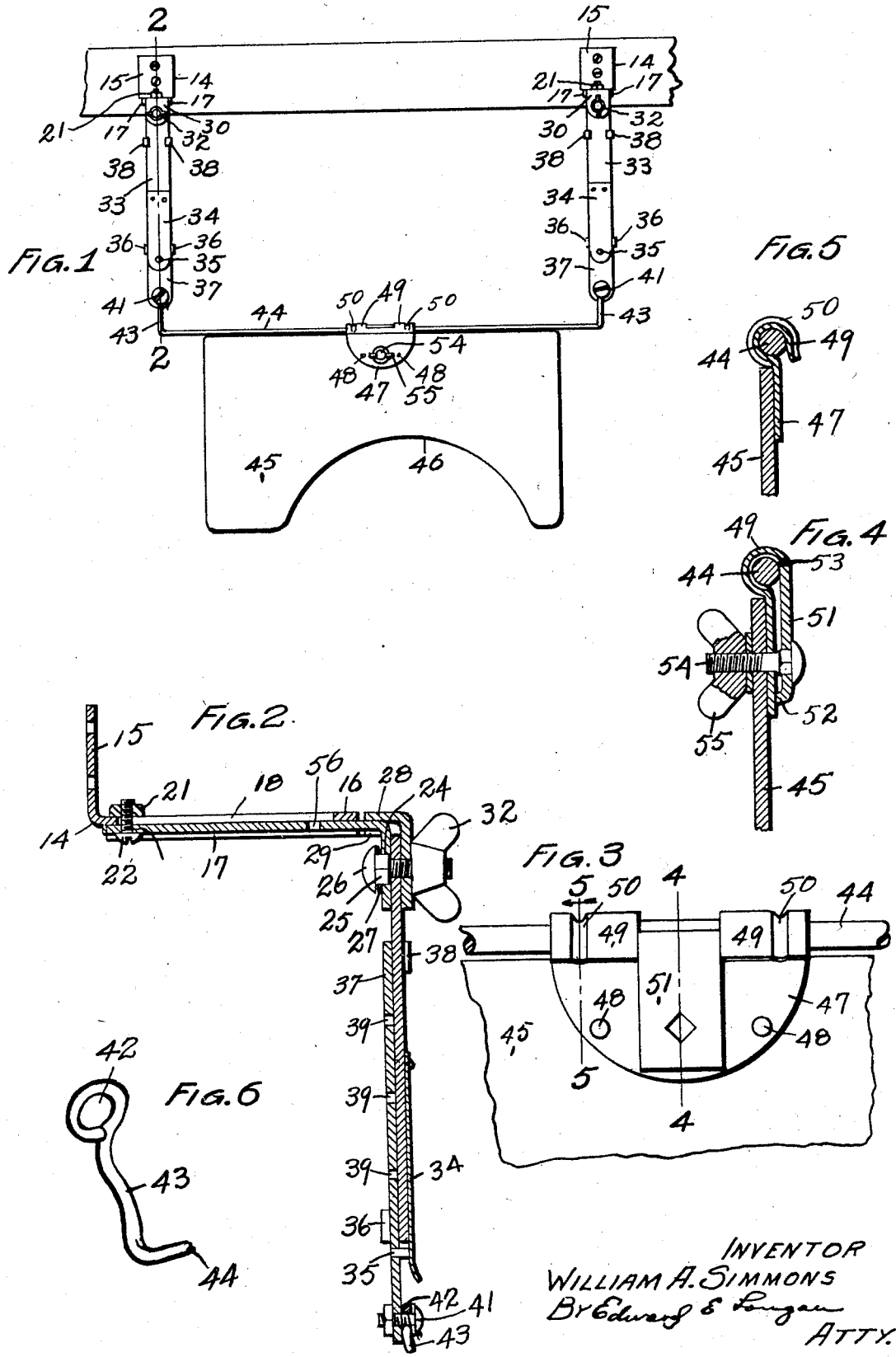

Dec. 8, 1931.  W. A. SIMMONS  1,835,187
GLARE SHADE
Filed Dec. 27, 1927   2 Sheets-Sheet 2
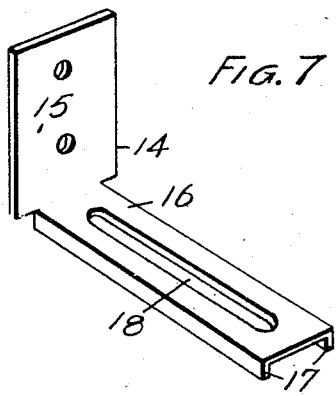
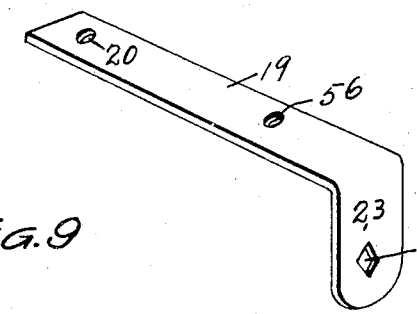
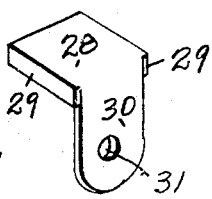
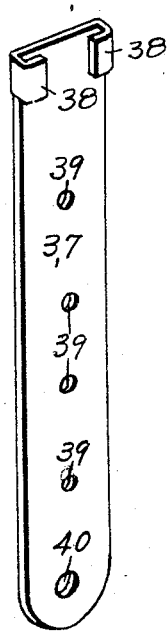
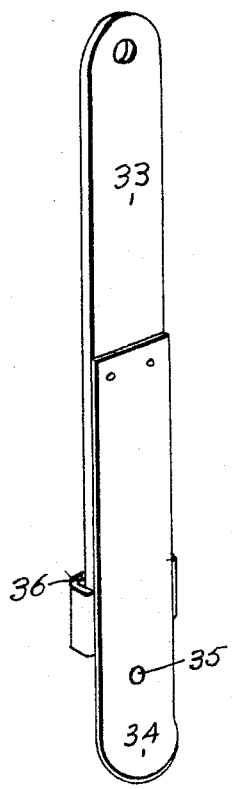
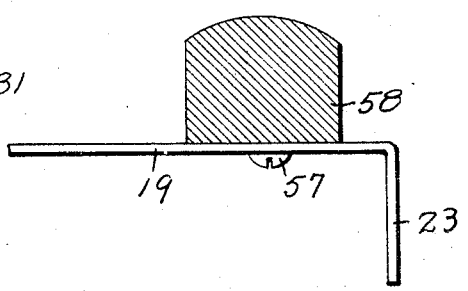
INVENTOR
WILLIAM A. SIMMONS
BY Edward E. Longan
ATTY.

Patented Dec. 8, 1931

1,835,187

UNITED STATES PATENT OFFICE

WILLIAM A. SIMMONS, OF ELDON, MISSOURI, ASSIGNOR TO SIMMONS GLARE SHIELD COMPANY, OF ELDON, MISSOURI, A CORPORATION OF MISSOURI

GLARE SHADE

Application filed December 27, 1927. Serial No. 242,645.

My invention relates to improvements in glare shades, and has for its primary object a glare shade designed to be mounted inside of a motor vehicle in such a manner that the driver of the vehicle will have his eyes protected either when driving directly against the sun or at night when motor vehicles with bright headlights approach him.

A further object is to construct a glare shade which is mounted for movement from side to side and which can be adjusted up and down to accommodate different heights of drivers.

A still further object is to construct a glare shade carried by adjustable brackets by means of which it can be moved to and from the windshield so that it will not interfere in any way with the automatic windshield wipers or with rear vision mirrors, etc.

In the drawings:

Fig. 1 is an elevation of my device showing the same in position;

Fig. 2 is an enlarged section of one of the brackets and arms taken on the line 2—2 of Fig. 1;

Fig. 3 is an enlarged fragmental view showing the manner of attaching the shade to the supporting rod;

Fig. 4 is a section taken on the line 4—4 of Fig. 3;

Fig. 5 is a section taken on the line 5—5 of Fig. 3;

Fig. 6 is an enlarged fragmental perspective of one end of the supporting rod;

Fig. 7 is a perspective view of one portion of the supporting bracket;

Fig. 8 is a similar view of another portion of a bracket;

Fig. 9 is a perspective view of a portion of the supporting bracket;

Fig. 10 is a perspective view of one portion of the swinging arm;

Fig. 11 is a perspective of another portion of the swinging arm;

Fig. 12 is an enlarged fragmental section showing another manner of mounting the supporting rod; and Fig. 13 is an enlarged view showing another manner of mounting the bracket.

In the construction of my device I employ a pair of brackets 14, these brackets having a plate 15, which is provided with openings for the insertion of screws so that it can be attached to the windshield or rather the frame thereof in a closed car.

The plate 15 has formed integral therewith an extension or member 16, which has its longitudinal edges 17 flanged. The plate is provided with a cutaway portion or slot 18, the purpose of which will be described in detail later.

Slidably carried by the extension 16 is a bar 19 which is provided with an opening 20 through which a bolt or screw passes, this bolt or screw passing through the slot 18 and by means of the nut 21 the screw 22 clamps the bar 19 and the member 16 together, and by reason of the slot the bar 19 can be moved forward and back.

The bar 19 is provided with an ear 23 which has an opening 24 therethrough. This opening is preferably made angular as illustrated in Fig. 8 so that the square portion 25 of a bolt 26 can pass therethrough. Between the head of the bolt 26 and the ear 23 is placed a resilient washer 27.

Carried by the bar 19 is a member 28, which has down-turned flanges 29 along its longitudinal edges. The member 28 is provided with an ear 30, which ear has an opening 31 formed therein through which the bolt 26 passes. The projecting end of the bolt 26 is provided with a wing nut 32.

Carried by the bolt 26 is an arm 33. This arm is mounted between the ears 23 and 30 in such a manner that it can be moved from side to side. Carried by the arm 33 is a spring latch 34, which has a projecting pin 35. The lower end of the arm 33 is provided with a bent over portion 36 of such a size that the arm 37 can pass therethrough. The upper end of the arm 37 is provided with a turned-over portion 38, which is adapted to receive the upper portion of the arm 33. In this manner the two arms are slidably secured together. The arm 37 has a plurality of vertically spaced openings 39, which are of sufficient size to permit the pin 35 carried by the spring latch 34 to enter. The lower end of the arm 37 is provided with an opening 40 through which bolts or screws 41 pass. These bolts or screws also pass through eyes 42 formed on the arms 43 of the supporting rod 44. It will be noted from Figs. 6 and 12 that the arms 43 are bent in such a manner that the eyes 42 are offset.

The glare shade 45 is formed of translucent material such as colored celluloid or pyralin. The lower edge of the shade 45 has an arcuate cutaway portion 46. It will be noted from Fig. 1 that this cutaway portion is not directly in the center of the shade but slightly toward the right. This arcuate cutaway portion is to permit the driver to see underneath the shade readily when he wants to get clear ahead vision, and the purpose of moving it up over toward the right is that all vehicles approaching pass on the left side. Secured to the shade at its upper end and midway between the vertical edges thereof is a plate 47. This plate is secured to the shade by means of screws, rivets, or other fastening means 48.

The upper edge of the plate 47 is formed in the form of a hook 49, which partially embraces the rod 44, so that the shade can be readily moved therefrom. The hooks 49 are beaded as at 50 so that they will have only a two-point contact on the rod 44 and thus eliminate friction.

It will be noted from Fig. 3 that the hooks 49 are narrower than the width of the plate so to form a passage for the locking plate 51. This locking plate has its end 52 turned down so that the end only will contact with the plate 47 and its end 53 bent over so that it will partially embrace the rod 44.

Passing through the plate 51 is a bolt 54. This bolt also extends through the plate 47 and through the shade, and is provided with a wing nut 55 so that the plate 51 can be loosened and permit the shade to be moved longitudinally along the bar 44. This is to permit adjustment of the shade from side to side to suit the convenience of the driver.

In Fig. 13 I have shown a modified form of mounting. This mounting is to be used on closed cars and in which the bar 19 has an opening 56 through which a screw 57 passes so that the bar 19 can be attached to the underside of the bow 58. This bow is usually a short distance rearward from the windshield and consequently no adjustment forward or back is necessary, and for that reason the bracket 14 can be eliminated.

When it is desired to attach my device directly to the windshield, I remove the rod 44 from the ends of the arms 37 and secure the ends or eyes 42 to a vacuum cup 59. Then the device can be applied directly to a windshield and held there by suction.

By having the brackets 14 adjustable it is possible, after the device has been installed, to adjust the brackets in and out so that when the arms 33 and 37 are swung from side to side they will not in any way interfere with the projections of windshield wipers, rear vision mirrors, or of the knob which is used to raise and lower the windshield in closed cars, and by reason of the spring latch 34 I can either increase or decrease the length of the arms which carry the rod 44 so that the shade can be adjusted to suit different heights of drivers.

The spring washer 27 permits the arm 33 to be frictionally gripped so that while the arms can be readily swung from side to side, sufficient friction can be set up to hold them in adjusted position and without danger of them shaking down.

In addition to the shade 45 being movable from side to side on the rod 44, it can also be turned up so as to be out of the line of the driver's vision when not in use.

Having fully described my invention, what I claim is:—

1. A glare shade comprising a pair of brackets each having a horizontal extension adapted to be secured to a frame in spaced horizontal alignment with each other, spaced apart parallel longitudinally extending flanges formed on said extensions, a rearwardly extending adjustable bar carried by each of said brackets between the flanges, means for locking each of said bars in adjusted position, a longitudinally adjustable arm pivotally secured at one end to each of said bars, spring held means for holding said arms in adjusted position, a supporting rod pivotally secured at each end to the opposite ends of said arms, a plate slidably mounted on said rod, a sheet of translucent material having an arcuate cutaway portion at its lower edge and carried at its upper edge by said plate, means for creating friction at the upper ends of said arms for holding said arms against accidental movement, and means for frictionally holding said plate in adjusted position on said rod.

2. A glare shield comprising a bracket for mounting the device upon a frame, a pair of rearwardly extending adjustable bars carried thereby, a longitudinally adjustable arm pivotally secured at one end to each of said bars, a horizontally extending shield-supporting rod pivotally connected at its ends to the opposite ends of said arms, spring means for holding said arms in their selectively adjusted positions, a plate slidably mounted on said rod for longitudinal movement therealong, a sheet of translucent material carried by said plate, and friction means for holding said plate in its adjusted positions along said rod.

In testimony whereof I have affixed my signature.

WILLIAM A. SIMMONS.